United States Patent
Yasutake et al.

(10) Patent No.: US 8,601,609 B2
(45) Date of Patent: Dec. 3, 2013

(54) FRICTION FORCE MICROSCOPE

(75) Inventors: Masatoshi Yasutake, Chiba (JP);
Masafumi Watanabe, Chiba (JP)

(73) Assignee: SII NanoTechnology Inc. (JP)

( * ) Notice: Subject to any disclaimer, the term of this patent is extended or adjusted under 35 U.S.C. 154(b) by 0 days.

(21) Appl. No.: 13/409,249

(22) Filed: Mar. 1, 2012

(65) Prior Publication Data
US 2012/0227139 A1 Sep. 6, 2012

(30) Foreign Application Priority Data
Mar. 4, 2011 (JP) ................. 2011-048198

(51) Int. Cl.
*G01Q 60/24* (2010.01)
*G01Q 60/22* (2010.01)

(52) U.S. Cl.
CPC ............... *G01Q 60/24* (2013.01); *G01Q 60/22* (2013.01)
USPC ........... 850/33; 850/1; 850/9; 850/30; 850/32

(58) Field of Classification Search
CPC ....... G01Q 20/00; G01Q 20/02; G01Q 20/04; G01Q 60/26; G01Q 60/28; G01Q 60/38; G01Q 10/06; G01Q 10/045; G01Q 10/065; A61B 5/0062; A61B 5/0066; A61B 5/6852; A61B 5/0095; A61B 8/12; A61B 8/4281; A61B 8/4461; A61B 8/543; A61B 8/5238; A61B 8/4416; A61B 8/445
USPC ............. 850/1, 2, 3, 6, 30, 33, 39, 41, 55, 40; 356/614, 600, 445, 501, 601, 369, 446, 356/496, 616, 620
See application file for complete search history.

(56) References Cited

U.S. PATENT DOCUMENTS

| | | | | |
|---|---|---|---|---|
| 5,553,487 | A * | 9/1996 | Elings | 73/105 |
| 5,804,708 | A * | 9/1998 | Yamanaka et al. | 73/105 |
| 6,349,591 | B1 * | 2/2002 | Fretigny et al. | 73/105 |
| 6,880,386 | B1 * | 4/2005 | Krotil et al. | 73/105 |
| 6,945,099 | B1 * | 9/2005 | Su et al. | 73/105 |
| 7,395,698 | B2 * | 7/2008 | Degertekin | 73/105 |
| 7,441,447 | B2 * | 10/2008 | Degertekin et al. | 73/105 |
| 7,461,543 | B2 * | 12/2008 | Degertekin | 73/105 |
| 7,552,625 | B2 * | 6/2009 | Degertekin | 73/105 |
| 7,557,933 | B2 * | 7/2009 | Fukuzawa et al. | 356/600 |
| 7,637,149 | B2 * | 12/2009 | Degertekin et al. | 73/105 |
| 7,707,873 | B2 * | 5/2010 | Degertekin | 73/105 |
| 7,787,133 | B2 * | 8/2010 | Iyoki et al. | 356/614 |
| 7,966,867 | B2 * | 6/2011 | Watanabe et al. | 73/105 |
| 7,973,942 | B2 * | 7/2011 | Iyoki et al. | 356/614 |
| 8,024,816 | B2 * | 9/2011 | Iyoki et al. | 850/1 |
| 8,214,010 | B2 * | 7/2012 | Courtney et al. | 600/407 |
| 8,220,318 | B2 * | 7/2012 | Degertekin | 73/105 |

(Continued)

FOREIGN PATENT DOCUMENTS

JP 06241762 9/1994

*Primary Examiner* — David A Vanore
(74) *Attorney, Agent, or Firm* — Adams & Wilks

(57) ABSTRACT

Provided is a friction force microscope that can measure a friction force by a cantilever in a quantitative manner. The friction force microscope includes a friction force calculating mechanism that calculates an effective probe height and a torsional spring constant of the cantilever from bending sensitivity determined from displacement information in a bending direction of the cantilever and torsional sensitivity determined from displacement information in a torsional direction of the cantilever, respectively, so as to use the calculated values for calculating the friction force.

12 Claims, 1 Drawing Sheet

(56) References Cited

U.S. PATENT DOCUMENTS

| | | | |
|---|---|---|---|
| 8,261,602 B2* | 9/2012 | Degertekin | 73/105 |
| 8,387,443 B2* | 3/2013 | King et al. | 73/105 |
| 2006/0283338 A1* | 12/2006 | Degertekin | 99/486 |
| 2007/0012094 A1* | 1/2007 | Degertekin et al. | 73/105 |
| 2007/0089496 A1* | 4/2007 | Degertekin | 73/104 |
| 2007/0103697 A1* | 5/2007 | Degertekin | 356/501 |
| 2007/0107502 A1* | 5/2007 | Degertekin | 73/105 |
| 2007/0295064 A1* | 12/2007 | Degertekin et al. | 73/105 |
| 2008/0049223 A1* | 2/2008 | Iyoki et al. | 356/369 |
| 2008/0049236 A1* | 2/2008 | Iyoki et al. | 356/614 |
| 2008/0177138 A1* | 7/2008 | Courtney et al. | 600/109 |
| 2008/0257024 A1* | 10/2008 | Watanabe et al. | 73/105 |
| 2008/0307865 A1* | 12/2008 | Degertekin | 73/105 |
| 2009/0027690 A1* | 1/2009 | Fukuzawa et al. | 356/600 |
| 2009/0264768 A1* | 10/2009 | Courtney et al. | 600/463 |
| 2010/0180354 A1* | 7/2010 | Degertekin | 850/1 |
| 2010/0205697 A1* | 8/2010 | Iyoki et al. | 850/1 |
| 2013/0047302 A1* | 2/2013 | Noel et al. | 850/6 |

* cited by examiner

FRICTION FORCE MICROSCOPE

BACKGROUND OF THE INVENTION

1. Field of the Invention

The present invention relates to a friction force microscope for measuring a friction force based on degree of a torsion of a cantilever in a scanning probe microscope.

2. Description of the Art

A friction force microscope is developed as an apparatus for measuring a friction force between a sample and a probe tip of a cantilever in a scanning probe microscope, and a basic principle thereof is as follows. Under a state in which the probe tip of the cantilever is brought into contact with the sample, the sample is scanned in a direction perpendicular to a longitudinal direction of the cantilever. Then, a displacement amount, at that time, in a torsional direction of the cantilever is obtained in each position, to thereby generate an image of a distribution of the friction force in a measurement range (see Japanese Patent Application Laid-open No. Hei 6-241762).

However, a conventional friction force microscope can easily measure a relative distribution of the friction force between the probe and the sample surface in the measurement range, but it is difficult for the conventional friction force microscope to measure an absolute value of the friction force. This is because the cantilever has a variation of characteristics. Therefore, it is difficult to use the apparatus in an application where friction forces of a plurality of samples are compared with each other by using a plurality of cantilevers.

Here, there is a problem as a variation of characteristics of the cantilever, which are parameters necessary for calculating the friction force from the measured torsional displacement signal, including (i) a torsional spring constant of the cantilever, (ii) sensitivity of a torsion signal of the cantilever, and (iii) a height of the cantilever probe.

It has been tried to measure those parameters for each cantilever so as to measure the absolute value of the friction force, and the following methods have been used: (i) using a torsional spring constant determined from dimensions of the cantilever; (ii) using sensitivity of the signal in a bending direction, which is regarded to be the same as sensitivity of the signal in the bending direction of the cantilever or to have a constant ratio to the sensitivity; and (iii) measuring a height of the probe by an electron microscope, an optical microscope, or the like.

However, the methods described above for correcting parameters of the cantilever have the following problems.

(i) It is difficult to accurately measure a thickness as a dimension of the cantilever, and because a spring constant in the torsional direction is proportional to the cube of the thickness, an original measuring error is enlarged. As a result, it is difficult to calculate an accurate torsional spring constant value.

(ii) Because of a spot shape and an intensity distribution of a laser beam applied to the cantilever, and unevenness of a reflective surface of the cantilever, sensitivity in the bending direction is not the same as sensitivity in the torsional direction, or does not have a constant ratio to the sensitivity in the torsional direction.

(iii) The probe tip of the cantilever is too small to observe by an optical microscope so that measurement is difficult. In addition, in the friction force microscope for measuring a friction force resulting from torsion of the cantilever in the scanning probe microscope, the height of the probe necessary for calculating the friction force is not a length from a surface of the cantilever to which the probe is attached to the probe tip but is a length from a rotation center of cantilever torsion to the probe tip. However, the rotation center of the cantilever torsion cannot be identified only by observing externally using a microscope or the like, and there is no means for determining from which part the length to the probe tip should be measured.

SUMMARY OF THE INVENTION

In order to solve the above-mentioned problems, it is an object of the present invention to provide a method of determining a friction force of a sample more accurately by performing calculation from a displacement signal of a cantilever and a resonance frequency of the cantilever so that a measuring error of a shape or the like of the cantilever is reduced, instead of directly measuring a probe height of the cantilever or a thickness of the cantilever, which has a large measuring error when dimensions are measured by observing an external shape.

In order to solve the above-mentioned problems, a friction force microscope of the present invention includes: a cantilever including a probe at a tip thereof; an X-Y drive mechanism for moving the probe on a sample surface placed to be opposed to the probe in an X-Y plane parallel to the sample surface; a Z drive mechanism for moving the probe in a Z direction perpendicular to the sample surface; displacement detection means for detecting displacement information of the cantilever in a bending direction and displacement information of the cantilever in a torsional direction; and friction force calculating means for calculating parameters necessary for calculating a friction force from a torsional displacement signal based on the displacement information of the cantilever in the torsional direction, the parameters including a probe height h from a center of cantilever torsion to the tip of the probe and a torsional spring constant $K_t$ obtained based on the cantilever torsion, based on bending sensitivity determined from the displacement information of the cantilever in the bending direction and torsional sensitivity determined from the displacement information of the cantilever in the torsional direction, respectively, and calculating the friction force based on the calculated probe height h and the torsional spring constant $K_t$.

In addition, in the friction force calculating means, the probe height h from the center of the cantilever torsion to the tip of the probe, and the torsional spring constant $K_t$ obtained based on the cantilever torsion are calculated by predetermined calculation equations.

Specifically, the calculation is performed by Equation 1 and Equation 2 by using a length L of a lever portion of the cantilever, a length d parallel to the lever portion from an end portion of the cantilever on the probe side to a tip position of the probe, a ratio $S_{DIF}$ between a displacement signal and a displacement amount in the bending direction of the cantilever in the Z direction, a displacement signal amplification factor $G_{DIF}$ in the bending direction of the cantilever in the Z direction, a ratio $S_{FFM}$ between a displacement signal and a displacement amount in the torsional direction of the cantilever in an X-Y direction, a displacement signal amplification factor $G_{FFM}$ in the bending direction of the cantilever in the X-Y direction, a width w of the cantilever, a resonance frequency $f_t$ of the cantilever in a torsional mode, a density $\rho$ of the cantilever based on a material of the cantilever, and a modulus of transverse elasticity G based on the material of the cantilever.

$$h = (L-d) \cdot \frac{S_{DIF}}{S_{FFM}} \cdot \frac{G_{FFM}}{G_{DIF}} \quad \text{[Equation 1]}$$

$$K_t = \frac{8}{3} \cdot \frac{w^4}{h^2} \cdot f_t^3 \cdot (L-d)^2 \cdot \sqrt{\frac{\rho^3}{G}} \quad \text{[Equation 2]}$$

According to the friction force microscope of the present invention, as described above, after accurately measuring the torsional spring constant of the cantilever, the probe is set to be in contact with the sample to scan the sample, and hence the friction force between the probe and the sample can be measured accurately from a torsional displacement of the cantilever generated by the friction force between the probe and the sample.

BRIEF DESCRIPTION OF THE DRAWINGS

In the accompanying drawings.

DETAILED DESCRIPTION OF THE PREFERRED EMBODIMENT

A friction force microscope according to an embodiment of the present invention is described.

Figure 2:
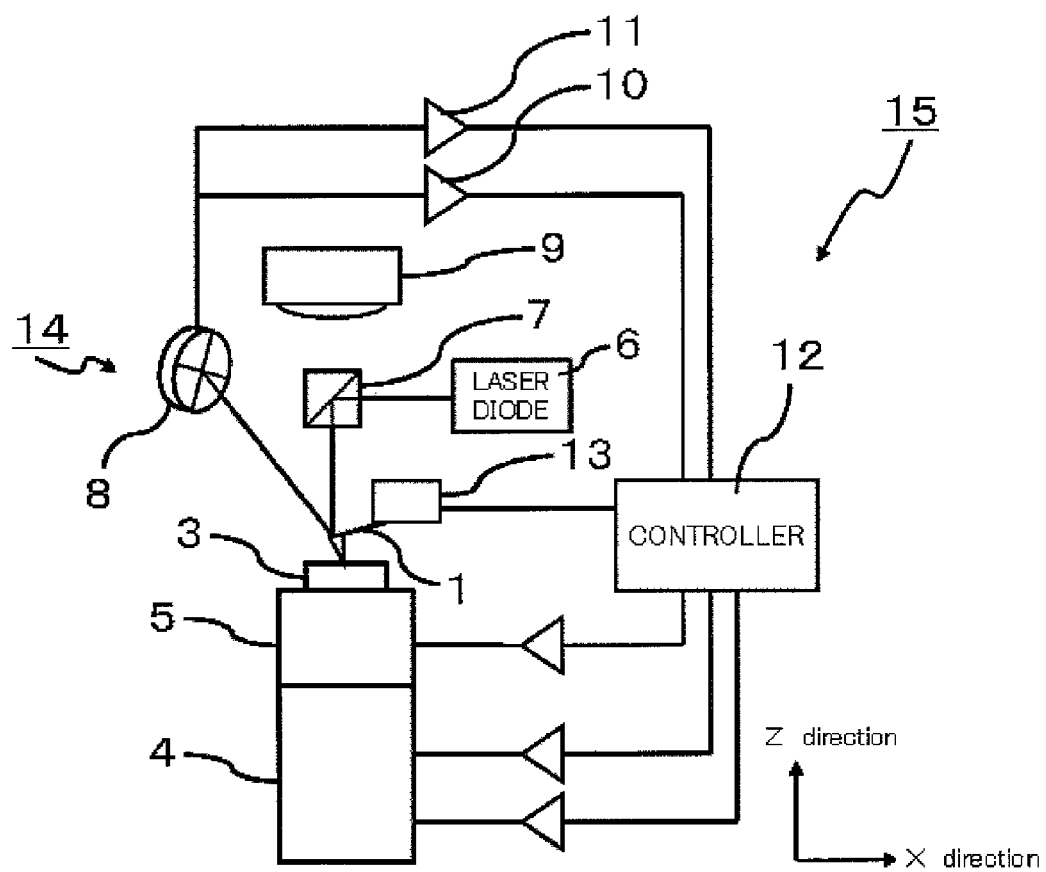
FIG. 2 is a conceptual diagram illustrating a typical structure of a friction force microscope of the present invention.

FIG. 2 illustrates a main structure of an example of a friction force microscope according to the present invention.

The friction force microscope according to the present invention includes an X-Y drive mechanism 4 for scanning a relative position between a cantilever 1 and a sample 3 in an X-Y plane parallel to a sample surface, a Z drive mechanism 5 for displacing the relative position in a Z direction perpendicular to the X-Y plane, and displacement information detection means 14 for detecting individual pieces of displacement information that are amplitudes of deformations in a bending direction and in a torsional direction generated in the cantilever 1 by an interatomic force between the tip of the probe 2 and the sample 3, when the relative position between the cantilever 1 and the sample 3 is displaced in a state in which (or when) a probe 2 fixed to a vicinity of the tip of the cantilever 1 is in contact with or close to the opposing sample 3. Specifically, the friction force microscope includes a laser diode 6 for irradiating the cantilever 1 with a laser beam, and a quadrant photodiode 8 for detecting the reflecting direction of the laser beam reflected by the cantilever 1. Then, a difference between upper and lower output levels of the quadrant photodiode 8, namely a signal indicating the displacement of the cantilever in the bending direction (hereinafter, referred to as "DIF signal") is amplified by a DIF signal amplifier 10 and is supplied to a controller 12 so that the displacement information of the cantilever 1 in the bending direction is detected. In addition, a difference between left and right output levels, namely a signal indicating the displacement of the cantilever in the torsional direction (hereinafter, referred to as "FFM signal") is amplified by an FFM signal amplifier 11 and is supplied to the controller 12 so that the displacement information of the cantilever 2 in the torsional direction is detected. This series of structures constitutes friction force detection means 15.

Figure 1:
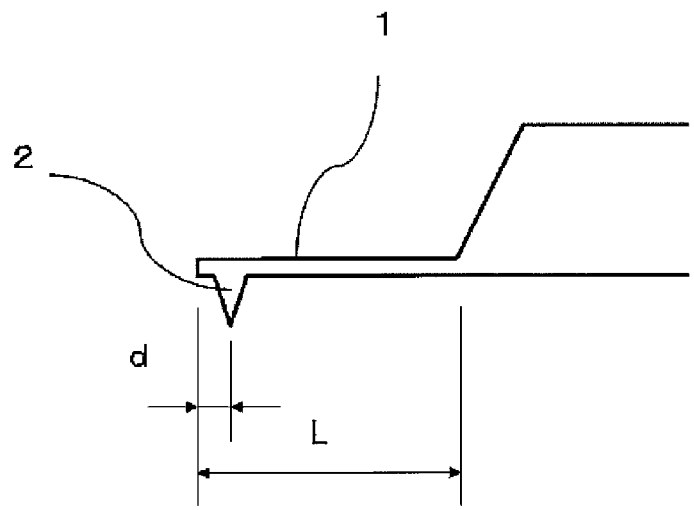
FIG. 1 is a diagram illustrating a total length L of a cantilever and a length d thereof from a tip to a probe.

In addition, as illustrated in FIG. 1, a total length L of the cantilever from the base to the tip, a width w thereof, and a length d thereof from the tip of the cantilever to the probe are measured in advance by an optical microscope 9. It is preferred that this optical microscope 9 be provided directly to the friction force microscope. In addition, the optical microscope may be disposed outside of the friction force microscope. In this case, the total length L of the cantilever 1, the width w thereof, and the length d thereof from the tip to the probe may be measured by other measuring method, for example, using an electron microscope.

Further, in order to measure frequency characteristics of the cantilever 1, the friction force microscope includes a cantilever vibrating portion 13 constituted of a piezoelectric element. This cantilever vibrating portion 13 vibrates the cantilever 1 in the direction including the bending direction component. When the frequency characteristics are measured, the frequency of vibrating the cantilever 1 is swept by the controller 12 in an arbitrary frequency range. If the frequency is sufficiently lower than a resonance frequency of the cantilever 1, bending does not occur in the cantilever 1, and hence the DIF signal is not changed. When the frequency is increased close to the resonance frequency, the cantilever 1 is bent, and the DIF signal is output. The signal obtained in this way is recorded for each frequency so that the frequency characteristics of the cantilever 1 can be measured in the same manner as in the conventional method. The present invention has a feature that the cantilever 1 is vibrated as described above, and the frequency characteristics in the torsional direction are measured not only from the DIF signal but also from the FFM signal.

In an ideal cantilever shape, the vibration in the bending direction and the vibration in the torsional direction are independent of each other. The vibration in the bending direction does not produce the FFM signal output in the torsional direction. However, actually, due to a manufacturing error of the cantilever 1 or an angle shift between the vibration direction and the bending direction, there may be generated a cross talk to the torsional direction. This phenomenon can be used for measuring the frequency characteristics in the torsional direction from the FFM signal. When comparing the frequency characteristics between the bending direction and the torsional direction obtained in this way, a resonance frequency $f_t$ in the torsional direction can be measured by reading a peak of a large vibration in the torsional direction.

In the friction force microscope having the above-mentioned structure, the relative position between the cantilever 1 and the sample 3 is adjusted by the X-Y drive mechanism 4 and the Z drive mechanism 5. Then, in the state in which the probe 2 is in contact with the sample 3, the relative position between the cantilever 1 and the sample 3 is changed by the X-Y drive mechanism 4 by a slight distance in the Z direction so that the probe 2 and the sample 3 are not separated. In this case, a level of the signal output from the DIF signal amplifier 10 is measured, and a ratio between the signal level and the displacement amount of the relative position in the Z direction is defined as a bending sensitivity $S_{DIF}$ (DIF sensitivity; hereinafter, referred to as "bending sensitivity"). Further, the relative position between the cantilever 1 and the sample 3 is changed by the X-Y drive mechanism 4 by a slight distance in a Y direction perpendicular to the longitudinal direction of the cantilever 1. In this case, a level of the signal output from the FFM signal amplifier 11 is measured, and a ratio between the signal level and the displacement amount of the relative position in the Y direction is defined as a torsional sensitivity $S_{FFM}$ (FFM sensitivity; hereinafter, referred to as "torsional sensitivity").

Here, the displacement amount in the Y direction is set so that the force in the Y direction obtained by multiplying the displacement amount in the Y direction and a torsional spring constant of the cantilever 1 is smaller than a static friction force between the probe 2 and the sample 3. The reason resides in that when the force of moving the probe 2 in the Y direction becomes larger than the static friction force, a contact position between the probe 2 and the sample 3 changes.

It is preferred for improving accuracy to determine the above-mentioned slight distances of displacements in the X direction and the Y direction not only by a single displacement but by a plurality of reciprocating displacements so as to measure an average of obtained signals.

The total length of the cantilever 1, the length d thereof from the tip to the probe, the bending sensitivity $S_{DIF}$, an amplification factor $G_{DIF}$ of the DIF signal amplifier 10, the torsional sensitivity $S_{FFM}$, and an amplification factor $G_{FFM}$ of the FFM signal amplifier 11, which are measured as described above, are substituted into Equation 1, to thereby calculate a height h of the cantilever.

Further, as described above, the cantilever 1 is vibrated by the cantilever vibrating portion 13 while sweeping the frequency. In this case, the FFM signal is measured so as to measure the frequency characteristics of the cantilever 1 in the torsional direction. Thus, the obtained resonance frequency $f_t$ of the cantilever 1 in the torsional direction, the total length L of the cantilever 1, the length d thereof from the tip to the probe, and the width w thereof which are measured by the optical microscope or the like, the height h of the cantilever 1 determined as described above, a modulus of transverse elasticity G of a material of the cantilever 1, and a density ρ of the material are substituted into Equation 2, to thereby calculate a torsional spring constant $K_t$ of the cantilever 1.

Further, in the state in which the probe 2 and the sample 3 are in contact with each other, the relative position between the cantilever 1 and the sample 3 is moved in the Y direction. In this case, there are calculated the FFM signal in the torsional direction generated by torsion of the cantilever 1 due to the friction force between the probe 2 and the sample 3 at each position during movement in the Y direction, and the friction force between the probe 2 and the sample 3 at each position from the torsional spring constant of the cantilever 1 obtained as described above.

In addition, the torsional spring constant $K_t$ of the cantilever 1 may be calculated without calculating the height of the probe 2 by Equation 1, by substituting the width w of the cantilever 1, the resonance frequency $f_t$, the bending sensitivity $S_{DIF}$, the amplification factor $G_{DIF}$ of the DIF signal amplifier 10, the torsional sensitivity $S_{FFM}$, the amplification factor $G_{FFM}$ of the FFM signal amplifier 11, the modulus of transverse elasticity G of the material of the cantilever 1 and the density ρ of the material into Equation 3 obtained by substituting Equation 1 into Equation 2. In this way, it is possible to eliminate the measuring of the total length L of the cantilever 1 and the length d thereof from the tip to the probe.

$$K_t = \frac{8}{3} \cdot w^4 \cdot f_t^3 \cdot \left(\frac{S_{FFM}}{S_{DIF}} \cdot \frac{G_{DIF}}{G_{FFM}}\right)^2 \cdot \sqrt{\frac{\rho^3}{G}} \quad \text{[Equation 3]}$$

In addition, if a bending spring constant $K_d$ of the cantilever 1 is known in advance, when the friction force is measured, the contact pressure between the probe 2 and the sample 3 can be calculated from the DIF signal, the bending sensitivity $S_{DIF}$, and the bending spring constant $K_d$. Then, by dividing the friction force at each position in the scanning area by the contact pressure, a coefficient of friction between the probe 2 and the sample 3 at each position in the scanning area can be measured in a quantitative manner.

What is claimed is:

1. A friction force microscope, comprising:
a cantilever including a probe at a free end portion thereof;
an X-Y drive mechanism for moving the probe on a sample surface opposed to the probe in an X-Y plane parallel to the sample surface;
a Z drive mechanism for moving the probe in a Z direction perpendicular to the sample surface;
displacement detection means for detecting displacement information of the cantilever in a bending direction and displacement information of the cantilever in a torsional direction; and
a controller configured to calculate a probe height h from a center of cantilever torsion to the tip of the probe and a torsional spring constant $K_t$ based on bending sensitivity determined from the displacement information of the cantilever in the bending direction and torsional sensitivity determined from the displacement information of the cantilever in the torsional direction, and calculate a friction force between the sample and the probe based on the calculated probe height h and torsional spring constant $K_t$.

2. A friction force microscope according to claim 1, wherein the controller is configured to calculate the probe height h according to the following equation:

$$h = (L-d) \cdot \frac{S_{DIF}}{S_{FFM}} \cdot \frac{G_{FFM}}{G_{DIF}}$$

where L denotes a length of a lever portion of the cantilever, d denotes a length parallel to the lever portion from an end portion of the cantilever on the probe side to a tip position of the probe, $S_{DIF}$ denotes a ratio between a displacement signal and a displacement amount in the bending direction of the cantilever in the Z direction, $G_{DIF}$ denotes a displacement signal amplification factor in the bending direction of the cantilever in the Z direction, $S_{FFM}$ denotes a ratio between a displacement signal and a displacement amount in the torsional direction of the cantilever in an X-Y direction, and $G_{FFM}$ denotes a displacement signal amplification factor in the bending direction of the cantilever in the X-Y direction.

3. A friction force microscope according to claim 2, wherein the controller is configured to calculate the torsional spring constant $K_t$ according to the following equation:

$$K_t = \frac{8}{3} \cdot \frac{w^4}{h^2} \cdot f_t^3 \cdot (L-d)^2 \cdot \sqrt{\frac{\rho^3}{G}}$$

where L denotes a length of a lever portion of the cantilever, d denotes a length parallel to the lever portion from an end portion of the cantilever on the probe side to a tip position of the probe, w denotes a width of the cantilever, $f_t$ denotes a resonance frequency of the cantilever in a torsional mode, ρ denotes a density of the cantilever based on a material of the cantilever, and G denotes a modulus of transverse elasticity based on the material of the cantilever.

4. A friction force microscope according to claim 1, further comprising cantilever vibrating means for vibrating the cantilever in the Z direction, and wherein the controller is configured to determine a resonance frequency $f_t$ in the torsional direction from frequency characteristics in the bending direction, which are obtained from a vibrating state acquired when the cantilever is swept in a predetermined frequency range close to a resonance frequency in the bending direction, and frequency characteristics in the torsional direction, which are obtained together with the frequency characteristics in the bending direction.

5. A friction force microscope according to claim 1, wherein the controller is configured to measure a length L of a lever portion of the cantilever, a length d parallel to the lever portion from an end portion of the cantilever on the probe side to a tip position of the probe and a width w of the cantilever based on one of an optical image or an electron image.

6. A friction force microscope according to claim 1, wherein the controller is configured to calculate the torsional spring constant $K_t$ by the following equation:

$$K_t = \frac{8}{3} \cdot \frac{w^4}{h^2} \cdot f_t^3 \cdot (L-d)^2 \cdot \sqrt{\frac{\rho^3}{G}}$$

where L denotes a length of a lever portion of the cantilever, d denotes a length parallel to the lever portion from an end portion of the cantilever on the probe side to a tip position of the probe, w denotes a width of the cantilever, $f_t$ denotes a resonance frequency of the cantilever in a torsional mode, ρ denotes a density of the cantilever based on a material of the cantilever, and G denotes a modulus of transverse elasticity based on the material of the cantilever.

7. A method of determining a friction force using a friction force microscope which comprises a cantilever including a probe at a free end portion thereof; an X-Y drive mechanism for moving the probe on a sample surface opposed to the probe in an X-Y plane parallel to the sample surface; and a Z drive mechanism for moving the probe in a Z direction perpendicular to the sample surface, the method comprising:
  detecting displacement information of the cantilever in a bending direction and displacement information of the cantilever in a torsional direction;
  calculating parameters necessary for calculating a friction force between the sample and the probe from a torsional displacement signal based on the displacement information of the cantilever in the torsional direction, the parameters comprising a probe height h from a center of cantilever torsion to the tip of the probe and a torsional spring constant $K_t$ obtained based on the cantilever torsion, based on bending sensitivity determined from the displacement information of the cantilever in the bending direction and torsional sensitivity determined from the displacement information of the cantilever in the torsional direction, and
  determining the friction force based on the calculated probe height h and torsional spring constant $K_t$.

8. A method of determining a friction force using a friction force microscope according to claim 7, wherein the probe height h is determined by the following equation:

$$h = (L-d) \cdot \frac{S_{DIF}}{S_{FFM}} \cdot \frac{G_{FFM}}{G_{DIF}}$$

where L denotes a length of a lever portion of the cantilever, d denotes a length parallel to the lever portion from an end portion of the cantilever on the probe side to a tip position of the probe, $S_{DIF}$ denotes a ratio between a displacement signal and a displacement amount in the bending direction of the cantilever in the Z direction, $G_{DIF}$ denotes a displacement signal amplification factor in the bending direction of the cantilever in the Z direction, $S_{FFM}$ denotes a ratio between a displacement signal and a displacement amount in the torsional direction of the cantilever in an X-Y direction, and $G_{FFM}$ denotes a displacement signal amplification factor in the bending direction of the cantilever in the X-Y direction.

9. A method of determining a friction force using a friction force microscope according to claim 8, wherein the torsional spring constant $K_t$ is determined by the following equation:

$$K_t = \frac{8}{3} \cdot \frac{w^4}{h^2} \cdot f_t^3 \cdot (L-d)^2 \cdot \sqrt{\frac{\rho^3}{G}}$$

where L denotes a length of a lever portion of the cantilever, d denotes a length parallel to the lever portion from an end portion of the cantilever on the probe side to a tip position of the probe, w denotes a width of the cantilever, $f_t$ denotes a resonance frequency of the cantilever in a torsional mode, ρ denotes a density of the cantilever based on a material of the cantilever, and G denotes a modulus of transverse elasticity based on the material of the cantilever.

10. A method of determining a friction force using a friction force microscope according to claim 7, further comprising determining a resonance frequency $f_t$ in the torsional direction from frequency characteristics in the bending direction, which are obtained from a vibrating state acquired when the cantilever is swept in a predetermined frequency range close to a resonance frequency in the bending direction, and frequency characteristics in the torsional direction, which are obtained together with the frequency characteristics in the bending direction.

11. A method of determining a friction force using a friction force microscope according to claim 7, wherein the measuring of a length L of a lever portion of the cantilever, a length d parallel to the lever portion from an end portion of the cantilever on the probe side to a tip position of the probe and a width w of the cantilever is performed based on one of an optical image or an electron image.

12. A method of determining a friction force using a friction force microscope according to claim 7, wherein the torsional spring constant $K_t$ is determined by the following equation:

$$K_t = \frac{8}{3} \cdot \frac{w^4}{h^2} \cdot f_t^3 \cdot (L-d)^2 \cdot \sqrt{\frac{\rho^3}{G}}$$

where L denotes a length of a lever portion of the cantilever, d denotes a length parallel to the lever portion from an end portion of the cantilever on the probe side to a tip position of the probe, w denotes a width of the cantilever, $f_t$ denotes a resonance frequency of the cantilever in a torsional mode, ρ denotes a density of the cantilever based on a material of the cantilever, and G denotes a modulus of transverse elasticity based on the material of the cantilever.

* * * * *